United States Patent [19]
Williams et al.

[11] Patent Number: 5,417,198
[45] Date of Patent: May 23, 1995

[54] ETHANOL INCINERATING BAKING OVEN

[76] Inventors: Robert W. Williams, 167 Brookville Rd., Brookville, N.Y. 11545; Thomas J. Clune, 22 Old Hill La., Levittown, N.Y. 11756

[21] Appl. No.: 981,135

[22] Filed: Nov. 24, 1992

[51] Int. Cl.6 .......................... A21B 1/00; F24C 15/32
[52] U.S. Cl. ................. 126/21 A; 126/21 R; 431/115
[58] Field of Search ............... 431/115, 5, 8; 34/72, 34/77, 78; 432/72; 126/21 R, 21 A, 19 R, 273 R

[56] References Cited

U.S. PATENT DOCUMENTS

| | | | |
|---|---|---|---|
| 2,110,209 | 3/1938 | Engels | 431/115 |
| 2,184,671 | 12/1939 | Hollander | 126/39 R |
| 2,795,054 | 6/1957 | Bowen, III | |
| 3,437,085 | 4/1969 | Perry | |
| 3,624,743 | 11/1971 | Dills | 126/21 R |
| 4,191,527 | 3/1980 | Trouillard | 432/72 |
| 4,214,869 | 7/1980 | Thekdi et al. | 432/72 X |
| 4,568,279 | 2/1986 | Logue et al. | 432/72 X |
| 4,599,067 | 7/1986 | Schwing et al. | 432/72 X |

Primary Examiner—Carl D. Price
Attorney, Agent, or Firm—Ohlandt, Greeley & Ruggiero

[57] ABSTRACT

An apparatus for the elimination of ethanol formed during the baking of yeast based products, such as bread, from the exhaust of a baking oven is provided. The apparatus includes a system of destroying the ethanol via thermal or catalytic incineration that uses the heat source already necessary for the baking of the yeast based products.

4 Claims, 1 Drawing Sheet

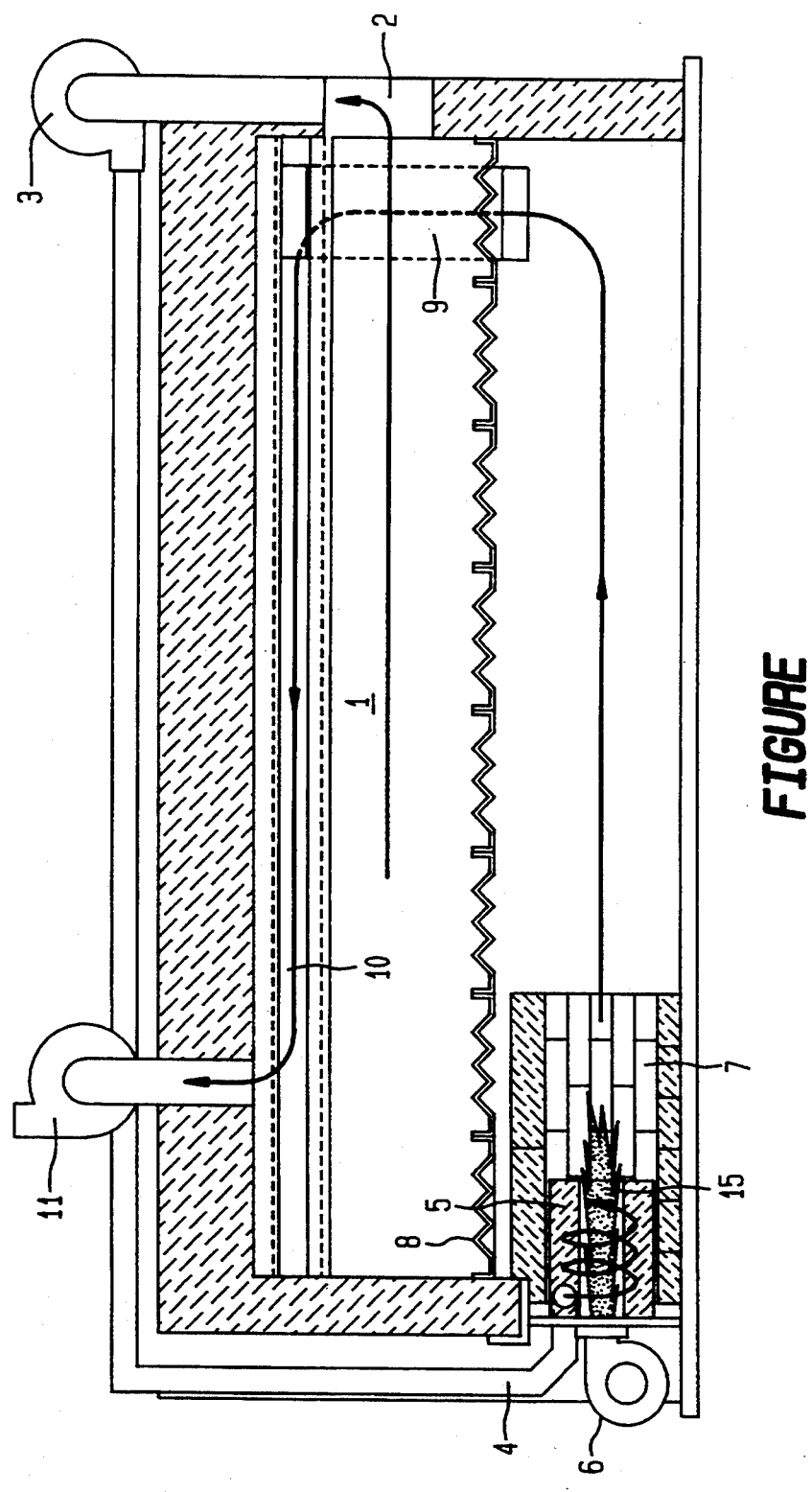
FIGURE

ETHANOL INCINERATING BAKING OVEN

BACKGROUND OF THE INVENTION

1. Field of the Invention

The present invention relates to an apparatus for baking yeast based products and the like and for the elimination of undesirable by-products that had previously been exhausted into the atmosphere from the apparatus. The elimination of the by-products is achieved by capturing the by-products, namely ethanol, in the exhaust from the baking chamber in an indirect fired oven and passing the by-products through the main burners of the oven that are already required for the oven's heating system.

2. Description of the Prior Art

In the prior art, the traditional manner of baking bread produces by-products. These baking by-products are ethanol (ethyl alcohol), water vapor and assorted gases, that, heretofore, have been exhausted or emitted into the atmosphere outside the bake oven. The ethanol in these by-products that had been emitted into the atmosphere proportionally cause air pollution problems. The ethanol by-product had been controlled with an afterburner system that incinerated the ethanol by heating the exhaust stream to a suitable temperature. While this method was able to reduce ethanol emissions, it wasted energy since the heat from the combustion was generally not used. Also, this system caused other pollution.

The present invention avoids the use of afterburners that consume gas or oil, in addition to the gas or oil necessary for baking. The present invention preserves the volume of the exhaust from the bake chamber of the oven in order to eliminate the moisture given up by the bread dough so that the breads are properly baked. This exhaust stream will also contain ethanol evaporated from the bread.

SUMMARY OF THE INVENTION

The present invention provides a self-sustaining incineration system that utilizes the already existing combustion system and fuel requirements to remove undesired baking by-products, such as ethanol, from an exhaust stream of an indirect baking oven.

The present invention has application in any commercial type indirect fired bread baking ovens such as, for example, revolving tray ovens, traveling tray ovens, conveyor ovens, tunnel ovens, rack ovens and the like.

DESCRIPTION OF THE DRAWINGS

The FIGURE is a cross-section through an oven chamber, combustion chamber and burner system of a baking oven.

DETAILED DESCRIPTION OF THE PREFERRED EMBODIMENTS

Referring to the Figure, yeast based products, such as, for example, loaves of bread and rolls, are contained within or carried through a baking chamber generally represented by reference numeral 1 for a desired period of time such that the bread is fully baked when exiting from the chamber. As the bread bakes, ethanol, and water vapor and assorted gases, are evaporated from the bread dough into the air inside the bake chamber 1. The air in the bake chamber 1 is extracted via duct 2 and blower 3 and is ducted, via conduit 4, sideways into mixing sleeve or tube 5 for incineration. The heating sleeve 5 can be a thermal heater. The mixing sleeve 5 can also be filled with an appropriate catalyst, such as, for example, platinum rings, for catalytic incineration. The air from the bake chamber 1 is ducted sideways via conduit 4 into the heating sleeve 5 in order to impart a spin to the air that will increase the residence time and the combustion of the ethanol in the air from the bake chamber.

A burner 6 supplies both fuel and primary air, e.g. air for combustion of the fuel, into a firing tube (not shown) is inside the heating sleeve 5. The burner system or the firing tube in the heating sleeve 5, is contained within a refractory tunnel 7, so that variations of the burner 6 from high to low fire will be averaged out and still provide the heat necessary for incineration and baking. The by-products that result from combustion, flow out of the refractory tunnel 7 and pass under radiator 8. Radiator 8 serves as a heat exchanger to provide the amount of heat that is necessary for the baking process. After the heated by-products are passed under the radiator 8, they travel up wall flues 9 into a plenum chamber 10 where additional heat is extracted from the by-products. The by-products are then discharged into the atmosphere outside of the bake chamber 1 by exhaust blower 11.

The baked products are proofed or allowed to rise to fermentation to produce carbon dioxide ($CO_2$) and ethyl alcohol ($C_2H_5OH$) as a natural reaction of the fermentation. The by-products that had been produced by the baking process are destroyed by the thermal or catalytic incineration so that the ethanol is removed.

The process of incinerating the ethanol generated from the baking process by the same heating system used for the baking process is the salient feature of the present invention. The present invention is generic in scope in that means or equivalents thereof are provided to control exhaust emissions internally in an oven rather than externally with afterburners.

We claim:

1. A baking oven having an exhaust stream of baking by-products comprising:

a bake chamber for baking a yeast based product, wherein ethanol in the yeast based product is emitted into the exhaust stream in said bake chamber;

a burner operatively connected to said bake chamber to heat said bake chamber and to receive the exhaust stream from said bake chamber, said burner having a firing tube;

a refractory tunnel enclosing said burner;

a mixing sleeve positioned in said refractory tunnel and circumferentially about said burner, said mixing sleeve being operatively connected to said bake chamber to receive the exhaust stream from said bake chamber, wherein said mixing sleeve spins the exhaust stream emitted from said bake chamber, said mixing sleeve having positioned therein said firing tube so that said firing tube is positioned in said refractory tunnel, wherein said mixing sleeve and said firing tube use the fuel used to heat said baking oven to also incinerate the ethanol in the exhaust stream prior to the exhaust stream being emitted out of said baking oven;

conduit means for transporting the exhaust stream from said bake chamber to said mixing sleeve; and, means for transporting the exhaust stream from said mixing sleeve to outside said baking oven.

2. In a baking oven having a bake chamber and a burner operatively connected to the bake chamber to heat the bake chamber and to receive an exhaust stream of baking by-products including ethanol from the bake chamber, a refractory tunnel positioned about the burner and having means for emitting from the baking oven an exhaust stream of baking by-products, the burner having a firing tube, the improvement comprising:

mixing means, positioned circumferentially about the burner and operatively connected to the bake chamber to receive the exhaust stream from the bake chamber, for spinning the exhaust stream emitted from the bake chamber, said mixing means having a mixing sleeve positioned about the burner to spin the exhaust stream thereby incinerating the ethanol in the exhaust stream, said mixing sleeve also having the firing tube therein, wherein said mixing sleeve and the firing tube are contained within the refractory tunnel of the baking oven, and wherein said mixing means uses the fuel used to heat the baking oven to incinerate the ethanol in the exhaust stream prior to emission of the exhaust stream from the baking oven.

3. The system according to claim 2, further comprising means for passing the exhaust stream from said bake chamber to said mixing means.

4. The system according to claim 2, wherein said mixing sleeve is a thermal heater.

* * * * *